Jan. 26, 1960   J. W. ANDERSON   2,922,981
AUTOMATIC VARIABLE SPEED-LIMIT SIGN
Filed Nov. 15, 1956   4 Sheets-Sheet 1
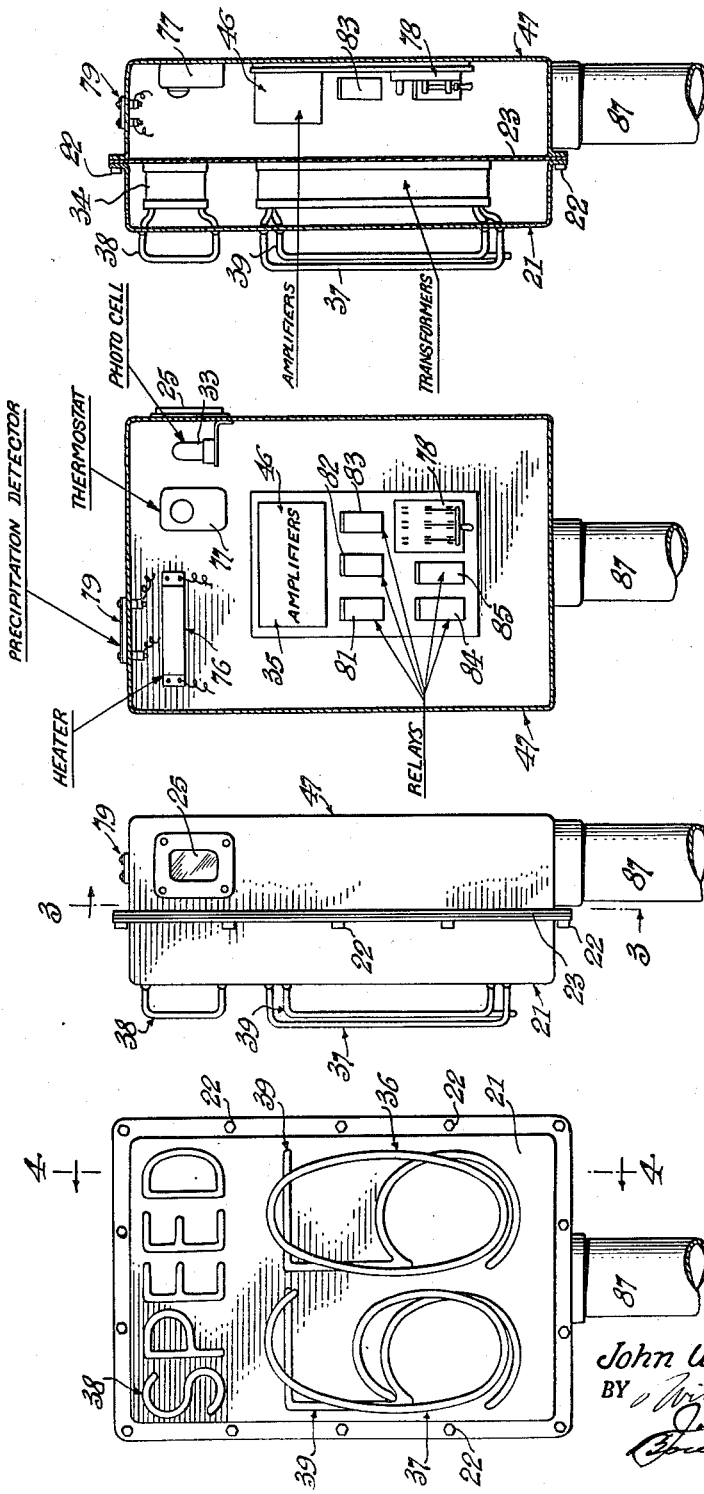
INVENTOR.
John W. Anderson
BY
ATTORNEYS

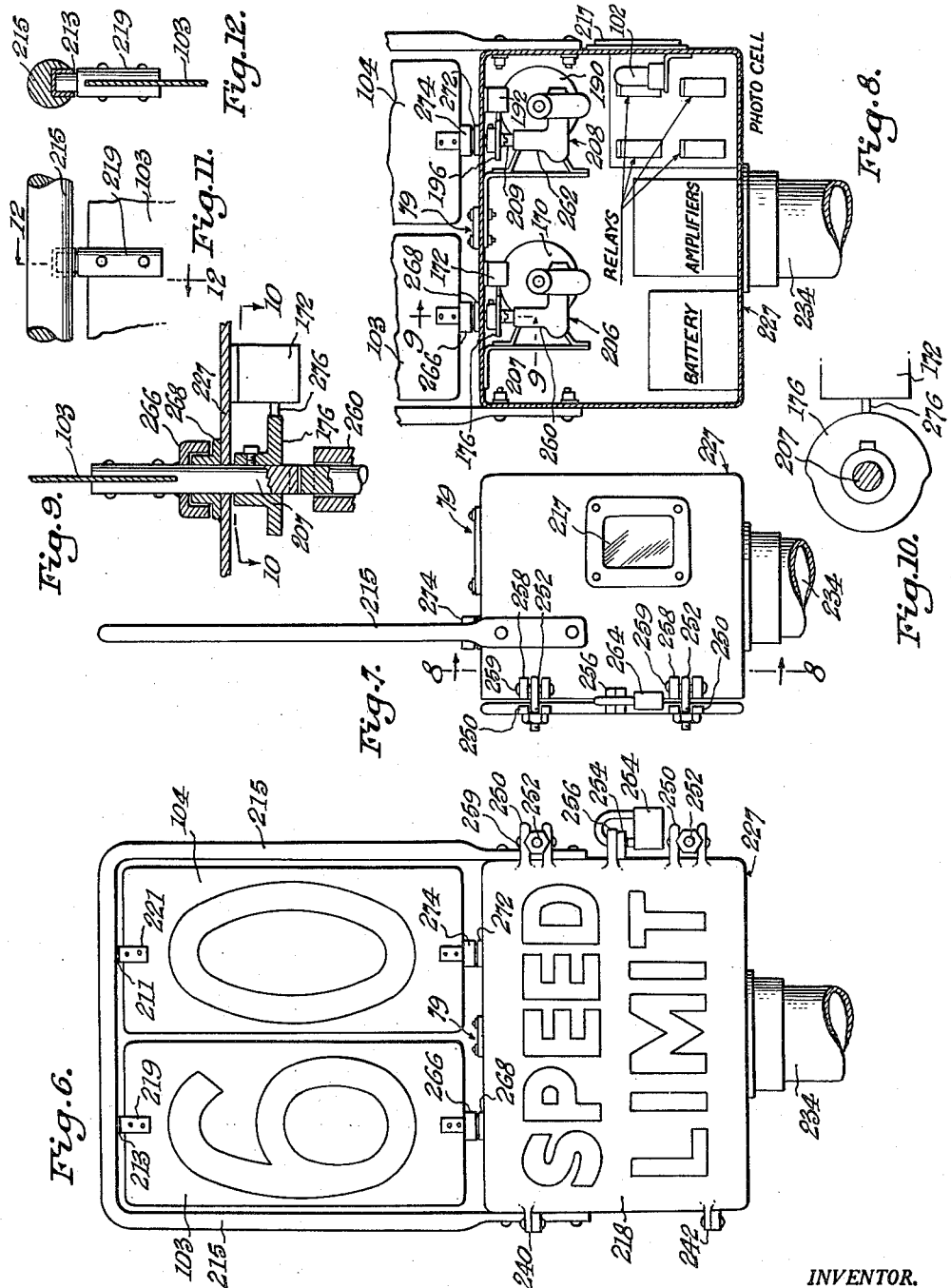

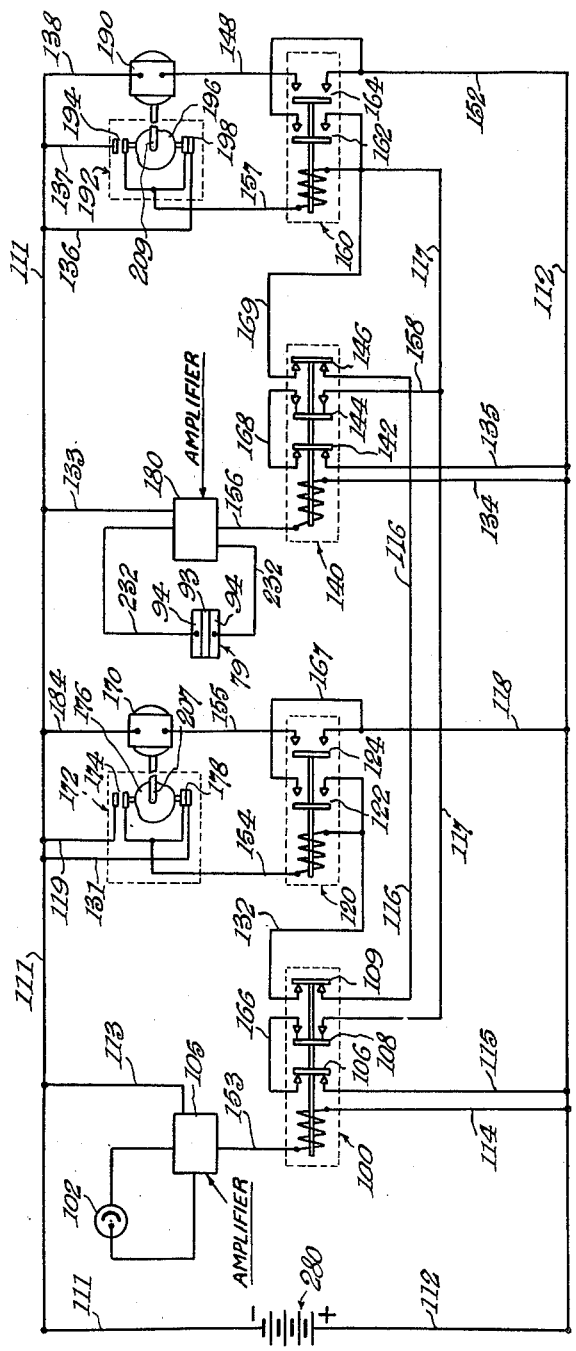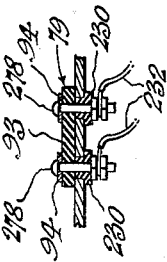

United States Patent Office 2,922,981
Patented Jan. 26, 1960

2,922,981

AUTOMATIC VARIABLE SPEED-LIMIT SIGN

John W. Anderson, Portland, Oreg.

Application November 15, 1956, Serial No. 622,503

10 Claims. (Cl. 340—22)

(Granted under Title 35, U.S. Code (1952), sec. 266)

The invention described herein may be manufactured and used by or for the Government for governmental purposes without the payment of any royalty thereon.

This invention relates to improvements in visual indicator devices such as signs adapted to be placed at intervals along roads or highways which will automatically designate the periodic safe speed for vehicles when natural light diminishes or when atmospheric precipitation occurs. Under present practice, speed limits are established and posted which are usually unnecessarily low for dry highways during daylight but which actually may be unsafe for wet or ice-covered roads or highways after nightfall. This invention in its various embodiments provides for reducing the speed limit one increment when either one of the two affecting conditions mentioned above occurs and an additional increment when the other condition occurs. As conditions of light and weather improve in either sequence, the improved sign of the present invention will indicate safely increased increments in traveling speeds.

It is a primary object of this invention to provide a new sensing electrical control circuit having a variable output means responsive to two variable input means.

It is an object of this invention to provide a new combined sensing and sequencing electrical circuit to operatively control visual indicator devices.

It is another object of this invention to provide a sign which automatically designates the various safe speeds for a vehicle in travel along roads or highways in accordance with periodically varying weather and light conditions.

It is also an object of this invention to provide an electrically controlled sign having an auxiliary power supply which automatically indicates to a vehicle operator safe speed limits for various types of vehicles in response to existing weather and daylight conditions on roads and highways.

It is a further object of this invention to provide a fully automatic sign having a self-contained power supply and an electronic control circuit to indicate the safe driving speed of vehicles in response to varying weather, precipitation, and daylight conditions.

It is an object of this invention to provide a new and novel combined sequencing and sensing electrical circuit to selectively operate visual indicator devices which automatically designate the various safe speeds for vehicles in travel along roads in accordance with periodically varying weather and light conditions.

It is a further object of this invention to provide an electrical traffic system for sensing and operatively controlling visual indicator devices in accordance with ambient varying weather and light conditions.

It is another object of this invention to provide a moisture-responsive system for selectively controlling visual sign devices to sense and indicate the safe traveling speed for road vehicles.

It is a still further object of this invention to provide a light-responsive system for electrically controlling visual indicator devices to sense and indicate safe speeds to road vehicles as natural light conditions change.

It is an object of this invention to provide a moisture-responsive and light-responsive system to selectively control visual indicator devices to sense and indicate safe speeds to road vehicles in response to varying ambient weather, precipitation and light conditions.

These and other objects will become apparent to those skilled in the art from the following description wherein—

Fig. 1 is a front elevation of a sign embracing one embodiment of the invention;

Fig. 2 is a side elevation thereof;

Fig. 3 is a vertical sectional view taken on line 3—3 of Fig. 2;

Fig. 4 is a vertical sectional view taken on line 4—4 of Fig. 1;

Fig. 6 is a front elevation of a modified sign of another embodiment of the invention;

Fig. 7 is a side elevation thereof;

Fig. 8 is a vertical sectional view taken on line 8—8 of Fig. 7;

Fig. 9 is a detailed vertical sectional view taken on line 9—9 of Fig. 8;

Fig. 10 is a horizontal sectional view taken on line 10—10 of Fig. 9;

Fig. 11 is a detailed view of the upper bearing of the revolving numeral plate;

Fig. 12 is a detailed vertical sectional view taken on line 12—12 of Fig. 11;

Fig. 13 is a circuit diagram of the second embodiment of this invention;

Fig. 14 is a plan view of the precipitation-sensing device; and

Fig. 15 is a sectional view taken on line 15—15 of Fig. 14.

Figure 5:
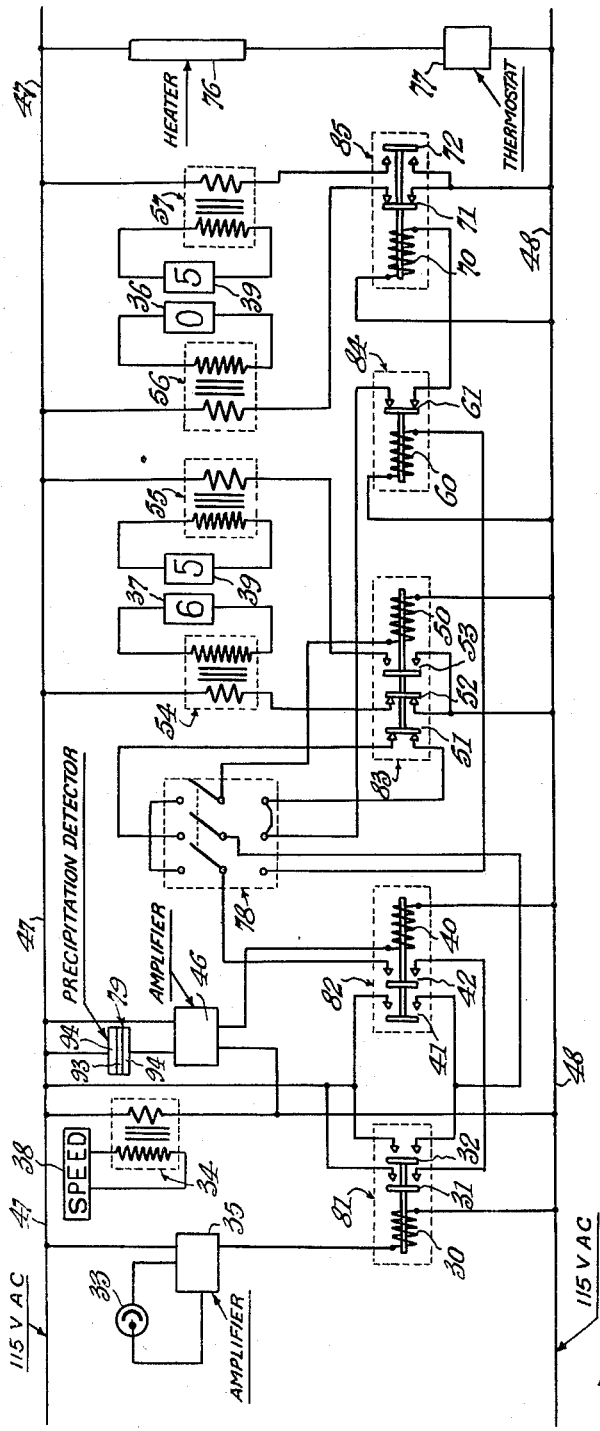
Fig. 5 is a circuit diagram of the above embodiment of the invention.

The drawings illustrate two different illustrative embodiments of the invention, one of which is shown by Figs. 1, 2, 3, 4, and 5, while another modified illustrative embodiment of the invention is shown respectively by Figs. 6, 7, 8, 9, 10, 11, 12, and 13. Figs. 14 and 15 illustrate one method of sensing precipitation which is common to both embodiments of the invention as illustrated in Figs. 5 and 13. However, it is to be understood that this invention is not limited to this particular type of circuit closing and breaking device as contact float devices or other devices which may be sensitive to humidity conditions of the air may be substituted therefor.

Figs. 1, 2, 3, 4, and 5 incorporate electrically energized illuminated letters and numerals of the neon sign type in this embodiment of the invention, as shown by reference numerals 36, 37, 38, and 39. Other suitable types of illuminated letters and figures may, of course, be substituted for the neon type of illuminated letters and numerals of this embodiment of the invention. Fig. 5 employs transformers 34, 54, 55, 56, and 57 to supply electrical energy as an illuminating means for the neon type of letters and numerals of the sign, a photoelectric cell 33 or other light-sensitive device, a precipitation detector 79, relays 81, 82, 83, 84, and 85 as required for the functions indicated by the wiring diagram of Fig. 5, a three-pole-double-throw manually operated transfer switch 78 to predetermine the safe speed range of the sign, amplifiers 35 and 46 required in the photoelectric cell and precipitation detector circuits respectively, and an electrically energized heater 76 which is controlled by or turned on-and-off by a thermostat 77, as the weather temperature drops to freezing or rises above freezing, respectively, to melt snow or ice falling upon and accumulating on the precipitation detector 79, so that the sign automatically functions equally well for rain or snow conditions.

Referring to circuit diagram designated as Fig. 5, when daylight passes through the small watertight window 25 of Fig. 2, and falls on the photocell 33, the current passing through the cell is increased by the amplifier 35 and maintains relay coil 30 in the energized position shown. A solar battery or photo-voltaic cell may be substituted for the photocell 33 indicated and combined with a sufficiently sensitive relay 81 would make the amplifier unnecessary in this circuit. With relay 81 energized by coil 30 and relay 82 de-energized, numeral 6 is lighted on the left side of the sign as member 37 of Fig. 1 and numeral 0 is lighted on the right side of the sign as member 36, so that the speed limit reads 60.

When night approaches, the light falling on the photocell 33 diminishes and the amplified photocell current decreases to the point that coil 30 of relay 81 is de-energized closing contacts 31 and 32. When contact 32 closes, a circuit is established from lead 47 of power line, through the three-pole-double-throw transfer switch 78 which is in the down position in Fig. 5, through contact 61, through coil 70 of relay 85 and finally to lead 48 of power line. A parallel circuit is established from contact 32 through two blades of the transfer switch 78, through coil 50 of relay 83 and to lead 48 of power line. Both relays 83 and 85 are thus energized, opening contacts 52 and 71 and closing contacts 53 and 72 so that the sign of Fig. 1 changes to read 55. When precipitation occurs as rain or snow, moisture collecting on the weather-exposed insulation block 93 of the precipitation detector 79 bridges the space between the parallel metal plates 94 located on top of detector 79. A weak current then passes through the moisture and is amplified sufficiently to energize coil 40 of relay 82, closing contacts 41 and 42. Assuming that rain, sleet or snow started to fall during daylight hours, the closing of contact 41 energizes coils 50 and 70 of relays 83 and 85 respectively, in the same manner as occurs when contact 32 closes as a result of night falling during dry weather as described above, and the sign of Fig. 1 again changes to read 55. If, however, when darkness causes relay 81 to operate, and relay 82 has already operated due to falling precipitation, or, when precipitation causes relay 82 to operate and relay 81 has already operated due to darkness, a circuit is established through contacts 31 and 42, through the transfer switch 78, through coil 60 of relay 84, and finally to lead 48 of the power supply. Coil 60 opens contact 61 of relay 84 de-energizing coil 70 of relay 85 changing the right hand numeral of the sign of Fig. 1 from numeral 5 of member 39 to numeral 0 of member 36 so that the sign now reads 50 as the designated speed. Either evaporation of precipitation or return of daylight breaks the circuit to relay 84 by opening contact 31 or 42 of relays 81 and 82 respectively, and the sign reverts to the 55 m.p.h. speed indication. When both daylight and dry conditions are restored, contacts 32 and 41 of relays 81 and 82 are both opened breaking the circuit to relay 85 and 83 so the sign once again reads the original speed numerals 60. With the transfer switch in the down position, the sign is equally operable for sequences of 50-45-40, 40-35-30, or 30-25-20 miles per hour simply by installing proper sign numerals.

For sequences of 55-50-45, 45-40-35, or 35-30-25 m.p.h., it is necessary to place the transfer switch in the up position and also to change numerals as required. For the 55-50-45 m.p.h. sequence, the numerals 6 and 5 in the left numeral position must be changed to numerals 5 and 4 respectively, and numerals 0 and 5 in the right hand numeral position must be interchanged. Further considering the 55-50-45 numeral sequence, when contact 32 of relay 81 or contact 41 of relay 82 closes, due to the fall of darkness or precipitation respectively, a circuit is established from lead 47 of the power supply through either contact 32 of relay 81 or contact 41 of relay 82 through the transfer switch 78, through contact 51 of relay 83, through contact 61 of relay 84, through coil 70 of relay 85 and finally to lead 48 of the electric power line. The energization of relay 85 changes the right hand numeral from 5 to 0 and the sign thus reads 50 as the speed limit. When both relays 81 and 82 have operated due to simultaneous conditions of rain and darkness, a circuit is established from lead 47 through contacts 31 and 42, through two blades of the transfer switch 78 now in the up position, through coil 50 of relay 83 and finally to lead 48. Operation of relay 83 changes numeral 5 to 4 and opens contact 51 of relay 83 which, by de-energizing relay 85, changes numeral 0 to 5 so that the sign changes to indicate a designated speed of 45 m.p.h. Either evaporation of precipitation or return to daylight breaks the circuit to relay 83. Numeral 4 thus reverts to numeral 5 in sign of Fig. 1 and contact 51 of relay 83 closes energizing relay 85, which changes numeral 5 to 0 so that the sign again reads 50 m.p.h. When both daylight and dry conditions are restored, contacts 32 and 41 of relay 81 and 82 respectively, are both opened breaking the supply to relay 85 so that the sign once more reads 55 as the original speed limit. During the above speed changes, the word "SPEED" in neon letters 38 of sign of Fig. 1 is continuously energized.

The sign of Figs. 1, 2, 3, 4 and 5 is housed by member 47 having a watertight window 25 admitting light to photocell 33. Precipitation sensing member 79 is mounted exposed to the weather on top of member 47. Neon tubing members 36, 37, 38, and 39 are supported on the front of sign casing 21. The sign of Fig. 1 is supported by tubular member 87, however, this invention is not restricted to a tubular support, as Fig. 1 may be supported by a side bracket or any other suitable means. Front casing member 21 is secured by bolt means 22 and dividing partition 23 to rear casing member 46. Precipitation sensing means 79 is secured externally to housing member 46 as shown in Figs. 2, 3, and 4. Fig. 3 shows one internal arrangement of the electrical relays 81, 82, 83, 84, and 85, amplifiers 35 and 46, photocell 33, heater 76, thermostat 77 and switch 78, necessary for the successful operation of the first embodiment of this invention. However, other arrangements of these components may be made without departing from the scope of this invention. Fig. 4 shows one arrangement of the gas-filled tubing numeral and letter members 36, 37, 38 and 39 being attached to their electrically energizing transformers 56, 54, 55 and 34 respectively, or other energizing sources well known to those skilled in the art.

The other embodiment of the invention is generally shown by Figs. 6, 7, 8, 9, 10, 11, 12 and 13 in the form of a speed limit sign which accomplishes the same objectives as that shown by Figs. 1, 2, 3, 4 and 5, but varies considerably in details of design. This design is primarily intended for use where no external source of power is available but may be utilized with an external source of alternating current either by providing a rectifier to convert the alternating current to direct current or by utilizing components designed for an alternating-current supply. Although battery 280 is used as a source of electrical energy to operate the circuit of Fig. 13, however, current from any suitable source of electrical energy may be used for energizing the circuit. This embodiment of the sign incorporates two independently revolving plate-like numeral members 103 and 104 having different luminescence letters on opposite sides of each plate member, a photo-electric device 102, a precipitation detector 79, relays 100, 120, 140 and 160 as required for the functions indicated in Fig. 13 and gear motors 170 and 190 and associated cam-operated switches 172 and 192 for sequencing the control circuit to motors 170 and 190 for rotating numeral plates 103 and 104 to indicate the preselected speed limit for the particular weather and light condition concerned. In this embodiment of the invention no heater with thermostat control is provided, because the heater would draw a prohibitively large amount of power from the battery. Of course, this feature could be added to Fig. 6 if an external power supply is provided.

Referring to the wiring diagram of Fig. 13, when natural light from window 217 falls on photocell 102, a current flows which, when amplified, maintains relay 100 in the energized position shown in Fig. 13. With relay 100 energized and relay 140 de-energized, numeral 6 appears on the left side of Fig. 6 and numeral 0 appears on the right side of same so that the sign indicates 60 as the allowable speed. Simultaneously, the back side of Fig. 6 reads 55, but this is considered to be of no consequence because a motorist approaching the rear of the sign will see no lettering, "SPEED," on this side of the sign to indicate that the luminescent numerals are intended as a speed limit. A cover could be provided to hide the numerals from view from the rear of the sign of Fig. 6, but this refinement does not appear necessary.

Referring to Fig. 13, when night approaches, relay 100 operates to the de-energized position. Contacts 106 and 109 operating together partially overlap contact 108; that is, momentarily all three contacts 106, 108 and 109 are closed during operation of relay 100 from the energized to the de-energized positions of relay 100 and vice versa.

A single-pole-double-throw cam operated switch 172 having contacts 178 and 174 is operated by a cam 176 connected to the shaft 207 of worm drive 206 attached to motor 170 which rotates the left numeral 103 not shown on Fig. 13 but indicated in Figs. 6 and 8. Similarly, a second identical cam operated switch 192 with contacts 198 and 194 is operated by cam 196 connected to shaft 209 of worm drive 208 attached to motor 190 which rotates the right numeral plate 104, not shown on Fig. 13, but indicated in Figs. 6 and 8. In neither switch, 172 or 192, are the contacts overlapped; that is, during the operation of each switch both contacts are momentarily open. When relay 100 operates to the de-energized position as mentioned above, a circuit is momentarily established by lead 112 from the positive side of battery 280 through contacts 106 and 108, through coil of relay 160, through contact 198 and by leads 136 and 111 to negative side of battery 280. This momentary impulse operates relay 160 and contacts 162 and 164 close. A circuit is thereby established from lead 112, through contact 162, and through contact 198 by leads 136 and 111 respectively to the negative side of battery 280, and lead 112 to the positive side of battery 280. In sequence, this action seals relay 160 in the energized position. The closing of contact 164 establishes still another circuit which energizes motor 190. Motor 190 starts and continues to run until it rotates the right numeral plate 104 of Fig. 6 through 180 degrees exposing numeral 5 in place of numeral 0 of Fig. 6. Cam 196 is secured to shaft 209 of worm gear drive 208 which extends as a support for sign numeral plate 104 having an end bearing 211 supported by member 215 of Figs. 6 and 8. After 180 degrees of rotation of cam 196 its associated single-pole-double-throw switch 192 breaks the seal-in circuit of relay 160 by virtue of the fact that momentarily both contacts 198 and 194 are open de-energizing relay 160 to open the motor circuit of Fig. 13 to stop motor 190.

The same momentary impulse mentioned above that energized relay 160 also energizes relay 120 through contacts 146, 109 and 178. Relay 120 seals itself in the energized position through contact 122 and motor 170 is energized through contact 124 and rotates the left sign plate 103 in the same manner as just described for the right numeral plate 104. Thus, the single impulse produced by relay 100 causes both numeral plates 103 and 104 to rotate 180 degrees and change the speed limit from 60 to 55 m.p.h.

The operation just described occurs in an identical manner if initiated by precipitation which effects the operation of relay 140 by means of precipitation detector 79. This is true because contacts 106 and 108 in series are wired in parallel with contacts 142 and 144 in series and inasmuch as contacts 142, 144 and 146 are all three momentarily closed during operation of relay 140, the same circuits are established as far as relays 120 and 160 and motors 170 and 190 are concerned as exist when the action is initiated by the photocell circuit. Thus, if rain falls during daylight hours, the speed limit is again reduced from 60 to 55 m.p.h.

If rain falls and relay 140 operates reducing the speed to 55 m.p.h., then darkness falls while rain continues, relay 100 operates producing an impulse which reaches relay coil 160 but not coil of relay 120 because contact 146 is open. Thus, a further rotation of the right sign plate changes numeral 5 to 0 and the speed limit reduces to 50 m.p.h. If darkness occurs first, followed by rain, the same result is produced; however, the circuit to relay 120 is open in this case at contact 109 instead of being open at contact 146.

When relays 100 and 140 are either energized or de-energized, an impulse is produced by overlapping contacts. With this in mind, consideration is now given to return of the sign indication to that for dry daylight conditions. Assuming that rain has occurred in the night and has evaporated before daylight so that relay 140 is de-energized, an impulse is produced by the operation of relay 140 which changes the right hand numeral, looking into the face of sign of Fig. 6, from numeral 0 to 5 resulting in the sign indicating 50 to 55 m.p.h. The left numeral of the sign does not change because contact 109 is open. The same result occurs if daybreak occurs before rain stops, except that in this case contact 146 is open so that the impulse does not reach relay 120. If rain stops and evaporates after daybreak, relay 140 produces an impulse to relay 160 and also to relay 120 through contacts 146 and 109, contact 146 being momentarily closed at the same time contacts 142 and 144 are closed due to overlap. The sign of Fig. 6 thus changes in speed indication from 55 to 60 m.p.h. If daybreak occurs after rain has evaporated on member 79, relay 100 produces an impulse which reaches both relay 160 and 120 through contacts 146 and 109 and again the sign changes in speed indication from 55 to 60 m.p.h.

The wiring indicated in Fig. 13 is equally operable for sequences of 50–45–40 m.p.h., 40–35–30 m.p.h., or 30–25–20 m.p.h. simply by substituting an appropriate left numeral plate. The right hand numeral designation for plate 104 need not be changed.

For sign indication sequences of 55–50–45 m.p.h., 45–40–35 m.p.h., or 35–30–25 m.p.h., it is necessary to change contact 109 from open to closed position when relay 100 is de-energized, also to change contact 146 from closed to open position when relay 140 is de-energized. In addition, appropriate changes are required in the numeral plates. For example, for the 55–50–45 m.p.h. sequence the left plate must be replaced with one having the numerals 5 and 4 back to back on plate 103, and the right numeral plate 104 must be reversed 180 degrees, but without changing the numerals. With these changes made an impulse produced by either relay 100 or 140 rotates only the right numeral plate which changes the speed limit from 55 to 50 m.p.h. If relay 100 operates and relay 140 has already operated or vice versa, both numeral plates 103 and 104 rotate because of an interconnection 116 between coils of relay 120 and relay 160 is established through contacts 109 and 146. In returning to the 55 m.p.h. speed from the 45 m.p.h. indicated speed, which is the indicated speed range for dark-wet conditions, an impulse produced either by relay 100 when light increases or by relay 140 when precipitation on member 79 evaporates, reaches both relay 120 and 160 and both signs rotate to indicate a speed of 50 m.p.h. because both contacts 109 and 146 are momentarily closed during the operation of either relay 100 or 140. If precipitation on member 79 evaporates after daybreak, relay 140 produces an impulse which operates only relay 160 because contact 109 is open. The sign indication accordingly, changes from 50 m.p.h. to 55 m.p.h. If daybreak occurs after rain has evaporated, relay 100 produces an impulse which also operates only relay 160 because contact 146 is open. In the above example, the sign of Fig. 6 also changes from 50 to 55 m.p.h.

Because torque cannot be transmitted backwards through the double worn-gear reduction units indicated by members 206 and 208 of Fig. 8, numeral plates 103 and 104 are self-locking and cannot be rotated, except by operating the gear motors 170 and 190. If it is desired to reduce the wear of gears due to vibration of the sign plates caused by wind, detents could be added to hold the plates in their 180 degree position. No brakes are provided on motors 170 and 190 because the cam-operated switches 172 and 192 can be adjusted to disconnect the power supply before the final position of the sign is reached. Furthermore, because of the large gear reduction, the coasting of the motor to a stop will not greatly affect the angular position of the numeral plates.

Some reduction of costs could conceivably be attained by using solenoids in place of gear motors for rotating the sign numeral plates 103 and 104, but the solenoids would not possess the operating strength needed for conditions of icing and poor lubrication and would not provide the self-locking feature of the worm-gear-reduction means 206 and 208.

No detailed design is given for the amplifiers 105 and 180 shown in Fig. 13 and amplifiers 35 and 46 of Fig. 5 in the photocell and precipitation-detector circuits of these two modifications of the invention as many different well-established circuits and components could be utilized for this purpose including those incorporating transistors. Transistor equipped amplifiers are particularly applicable because of their small size, low power absorption and long life. The amplifiers need only be very small and simple.

The raintight enclosures 21 and 47 of Fig. 2 and enclosures 218 and 227 of Fig. 6 are indicative only and subject to modification to facilitate access to internal components. Other modifications may be desirable to prevent damage by vandalism.

The sign of Figs. 6, 7, 8, 9, 10, 11, 12, 13, 14 and 15 is generally housed by member 227 having a frontal hinged cover member 218 carrying luminescent lettering, "SPEED LIMIT," which may be secured by a lock 264, hinge members 240 and 242, flange members 250, 256, bolt means 252 being attached by flange members 258 and pin means 259 therein. Members 258 are secured to housing member 227 which contains therein watertight window 217 while precipitation sensing member 79 is secured to the top external surface of housing 227 in a manner that its internal circuit terminals 232 may be electrically connected to amplifier means 180. The window 217 juxtaposed to photocell 102 in housing 227 as shown in Fig. 7, may be located in any suitable position in housing 227. Rotating numeral plate 103 is supported by gear shaft 207 and 219 in its bearing 213 in support member 215. Rotating numeral plate 104 is supported by gear shaft 209 and shaft 221 is supported in its bearing 211 which is located in support frame member 215. Casing member 227 is supported by tubular means 234, or other suitable means.

Fig. 9 shows the means and relationship of cam 176 as mounted on gearing shaft 207 to actuate switch 172. Member 207 terminates in numeral plate member 103, and member 268 is a sleeve bearing member secured to housing 217 through which gear shaft 207 passes. Member 266 is secured by welding or other means to shaft 207 as a bearing end cover means for bearing member 268. Shaft 209 of Figs. 6 and 8 likewise carries cam 196 which actuates switch 192, and passes through sleeve bearing 272 secured to housing member 227. Member 274 of Figs. 8 and 9 is secured to shaft 209 and serves as an end bearing cover means for member 272 secured to housing member 227. Member 209 terminates as an end support for rotating numeral plate member 104. For ease of assembly and repair, shafts 207 and 209 may each be provided with a coupling juxtaposed to their respective bearing members 268 and 272.

Fig. 10 discloses a rotating cam 176 on gear shaft member 207 having a contact surface which slidably engages movable switch follower member 276 of electrical switch member 172 to determine the sequence of operation of switch 172. Switch 192 is a similarly operated electrical switch of the same type, design and function as the above described switch 172.

Figs. 11 and 12 illustrate the upper bearing means of rotatable numeral plate 103 which terminates in shaft member 219 rotatably mounted in bearing means 213 secured in inverted U-shaped support member 215. Numeral plate member 104 of Fig. 6 likewise is supported by an end shaft member 221 which is rotatably secured in bearing 211 of support member 215.

Figs. 14 and 15 show the precipitation sensing means 79 of the embodiments of this invention, in which member 93 is of suitable phenol or other suitable material that is nonconductive when dry and becomes a switch closing means when covered with precipitation between metal members 94. Metal members 94 serve as terminal supports and electrical bar contacts for terminal binding posts 278 which are insulated by members 230 from housing 227 after which the threaded ends of members 278 engage by nut or other suitable means terminals 232 of amplifier 180.

The invention may incorporate any of the many means available to detect the changes and to cause the corresponding changes in speed limit indication; furthermore, the speed changes are not limited to the 5 mile per hour increments described. Increments of speed for the sign may be of any reasonable value and may be either as increases or decreases with changes in conditions as selected. Also, two or more changes in ambient weather conditions may produce a single change in indication by proper selection of circuit components and by proper interconnection thereof. The means of indicating the variable speed limits also is not limited to those shown, as a plurality of these units with rearrangements may be used in a unitary structure for both trucks and cars or other vehicles as may be adapted for road and highway use.

Having thus described my invention, what I claim as new and wish to secure by Letters Patent is:

1. A control circuit comprising electrical energizing means, variable indicia means including electromagnetic means to actuate said indicia means, precipitation means, light sensing means, and means selectively and electrically connecting said energizing means and said precipitation and light sensing means to said electromagnetic means to actuate said indicia means.

2. A signalling system for indicating the safe speed of travel for motor vehicles on highways comprising speed indicating means and control means for said indicating means, said control means including a plurality of sensing means and switching means connected thereto, operation of said switching means being initiated by said sensing means, electrically actuated means for varying said speed indicating means, said switching means directly interconnecting said electrically actuated means for varying said speed indicating means and said plurality of sensing means whereby changes in said speed indicating means are imparted directly thereto responsive to variations detected by said plurality of sensing means.

3. A signalling system for indicating the safe speed of travel for motor vehicles on highways comprising speed indicating means and control means for said indicating means, said control means including a plurality of sensing means and a first switching means connected to each of said plurality of sensing means, electrically actuated means for varying said speed indicating means, a second switching means directly interconnecting each said first switching means and said electrically actuated means for varying said speed indicating means whereby said speed indicating means is varied directly responsive to variations detected by said plurality of sensing means.

4. A signalling system for indicating the safe speed of travel for motor vehicles on highways comprising speed indicating means and control means for said indicating means, said control means including a first moisture sensing means and a first switching means connected thereto, a second sensing means responsive to variations in ambient light conditions and a second switching means connected thereto, electromagnetic means connected to said speed indicating means for imparting changes thereto, and switching means separately directly interconnecting each said first and second switching means and said electromagnetic means connected to said speed indicating means whereby said speed indicating means is varied directly responsive to variations detected independently by said first and second sensing means.

5. A signalling system for indicating the safe speed of travel for motor vehicles on highways comprising cooperating rotatable speed indicia-bearing members and control means therefor, said control means including a plurality of sensing means and a first switching means connected to each of said pluraliy of sensing means, motor driven means connected to said cooperating rotatable speed indicia-bearing members, mechanically operated switch means connected to said motor driven means for simultaneous operation with said cooperating rotatable speed indicia-bearing members, a second switching means directly interconnecting each said first switching means to said motor driven and mechanically operated switch means whereby the operation of said cooperating rotatable speed indicia-bearing members is controlled by said motor driven means and said mechanically operated switch means responsive to variations independently detected by said plurality of sensing means for indicating speed limits commensurate with conditions detected independently by said plurality of sensing means.

6. A signalling system for indicating the safe speed of travel for motor vehicles on highways comprising cooperating rotatable speed indicia-bearing members and control means therefor, said control means including a first moisture sensing means and a first switching means connected thereto, a second sensing means responsive to variations in ambient light conditions and a second switching means connected thereto, motor driven means connected to said cooperating rotatable speed indicia-bearing members, cam operated switch means connected to said motor driven means for simultaneous operation with said cooperating rotatable speed indicia-bearing members, a second switching means directly interconnecting each said first switching means to said motor driven and cam operated switch means, and energizing means for said system whereby the operation of said cooperating rotatable speed indicia-bearing members is controlled by said motor driven means and said cam operated switch means responsive to variations independently detected by said first and second sensing means for indicating speed limits commensurate with conditions detected independently by said first and second sensing means.

7. A sequence control circuit comprising an electrical energizing means connected to the circuit, visual indicator means comprising a plurality of superimposed illuminated indicia elements, electromagnetic switch means to selectively actuate by induction means a plurality of indicia elements, light-sensing means electrically connected to the control circuit, moisture-sensing means electrically connected to the control circuit, dual sequencing means electrically connecting the control circuit to the indicator means to be responsive to the two sensing means to indicate by selective increments desired indicia information.

8. A visual indicator apparatus of the character described comprising a plurality of superimposed indicating elements, an electric supply means, control circuit means comprising a plurality of electromagnetic contact means to selectively actuate the indicating elements and energized by the electric supply means, light-responsive and moisture-responsive sensing means electrically connected to the control circuit means to operate the control circuit, and a plurality of conductors operatively interconnecting the electric supply means, sensing means, control circuit means and indicating elements to be responsive to the sensing means to indicate by a plurality of selective and alternative indicating elements desired indicia information.

9. An indicating apparatus to signal the safe speed to traveling motor vehicles, comprising electrical energizing means, speed indicia means, light-sensing means, precipitation-sensing means comprising a resistive aqueous electrical switch and an electrical heater means actuated by thermostatic means to prevent ice formation on the precipitation-sensing aqueous switch, control circuit means to actuate the indicia means in response to the two sensing means and electrically interconnecting operatively and severally the indicia means, electrical energizing means, and the two sensing means to actuate and sequentially operate by predetermined speed increments the indicia means to indicate to passing motor vehicles the safe road speed in response to varying ambient weather, precipitation and light conditions.

10. A sequence control system comprising electrical energizing means electrically connected thereto, visual indicator means comprising a plurality of superimposed illuminated indicia elements, electromagnetic switch means to selectively actuate by induction means a plurality of the indicia elements, light-sensing means, and precipitation-sensing means comprising a resistive aqueous electrical switch means and electrical heater means actuated by thermostatic means to prevent formation of ice on the aqueous switch means during freezing temperature, control circuit means to actuate the indicator means in response to the two sensing means and electrically interconnecting operatively and severally the indicator means, electrical energizing means and the two sensing means to actuate and sequentially operate by predetermined speed increments the indicator means to indicate to passing motor vehicles the safe speed in response to varying ambient weather, precipitation and light conditions.

References Cited in the file of this patent

UNITED STATES PATENTS

| | | |
|---|---|---|
| 2,182,530 | Baer | Dec. 5, 1939 |
| 2,284,633 | Bosch | June 2, 1942 |
| 2,301,247 | Brownee | Nov. 10, 1942 |
| 2,362,971 | Bosch | Nov. 21, 1944 |
| 2,640,958 | Davis | June 2, 1953 |
| 2,787,695 | Dyke | Apr. 2, 1957 |
| 2,849,701 | Clark | Apr. 26, 1958 |

OTHER REFERENCES

"Popular Science," page 91, July 1952.
"American City," page 149, May 1953.